US010543720B2

(12) United States Patent
Motomitsu

(10) Patent No.: US 10,543,720 B2
(45) Date of Patent: Jan. 28, 2020

(54) HEAVY DUTY PNEUMATIC TIRE

(71) Applicant: The Yokohama Rubber Co., LTD., Minato-ku, Tokyo (JP)

(72) Inventor: Takamasa Motomitsu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/090,146

(22) PCT Filed: Mar. 29, 2017

(86) PCT No.: PCT/JP2017/013095

§ 371 (c)(1),
(2) Date: Sep. 28, 2018

(87) PCT Pub. No.: WO2017/170788

PCT Pub. Date: Oct. 5, 2017

(65) Prior Publication Data

US 2019/0111736 A1 Apr. 18, 2019

(30) Foreign Application Priority Data

Mar. 31, 2016 (JP) ................................ 2016-070353

(51) Int. Cl.
*B60C 11/03* (2006.01)

(52) U.S. Cl.
CPC ..... *B60C 11/0306* (2013.01); *B60C 2011/036* (2013.01); *B60C 2011/0346* (2013.01);
(Continued)

(58) Field of Classification Search
CPC . B60C 11/03; B60C 11/0306; B60C 11/0309; B60C 2011/0337;
(Continued)

(56) References Cited

U.S. PATENT DOCUMENTS

2007/0199633 A1* 8/2007 Hayashi ............. B60C 11/0311 152/209.18
2010/0294409 A1* 11/2010 Bolzoni ............. B60C 11/0306 152/209.18

(Continued)

FOREIGN PATENT DOCUMENTS

| | | | |
|---|---|---|---|
| EP | 1 759 890 | | 3/2007 |
| FR | 2586621 | * | 3/1987 |
| JP | H02-299909 | | 12/1990 |
| JP | 2013-248927 | | 12/2013 |
| JP | 2014-213841 | * | 11/2014 |
| WO | WO 2006/001202 | | 1/2006 |
| WO | WO 2014/002507 | | 1/2014 |
| WO | WO 2014/178182 | | 11/2014 |
| WO | WO 2015/107599 | * | 7/2015 |
| WO | WO 2016/013605 | * | 1/2016 |

OTHER PUBLICATIONS

International Search Report for International Application No. PCT/JP2017/013095 dated Jun. 6, 2017, 4 pages, Japan.

*Primary Examiner* — Eric Hug
(74) *Attorney, Agent, or Firm* — Thorpe North & Western

(57) ABSTRACT

A heavy duty pneumatic tire comprises a tread pattern that comprises: circumferential main grooves with a wave-like shape, shoulder lug grooves extending in the tire width direction to a ground contact edge and connecting to the circumferential main grooves at first groove turning portions that protrude outward; center lug grooves connecting to the circumferential main grooves at second groove turning portions that protrude inward; and center blocks defined by adjacent center lug grooves of the center lug grooves adjacent in the tire circumferential direction and the circumferential main grooves, forming a row in the tire circumferential direction. The center lug grooves and the circumferential main grooves have a narrower groove width than the shoulder lug grooves; and each region of the center blocks includes two first narrow grooves having a curved line shape with no bent portions and having a narrower groove width than the shoulder lug grooves.

17 Claims, 4 Drawing Sheets

(52) U.S. Cl.
CPC ................. *B60C 2011/0348* (2013.01); *B60C 2011/0351* (2013.01); *B60C 2011/0353* (2013.01); *B60C 2011/0355* (2013.01); *B60C 2011/0365* (2013.01); *B60C 2011/0372* (2013.01); *B60C 2011/0383* (2013.01); *B60C 2200/065* (2013.01)

(58) Field of Classification Search
CPC ..... B60C 2011/0339; B60C 2011/0341; B60C 2011/0346; B60C 2011/0348; B60C 2011/0358; B60C 2011/036; B60C 2011/0372; B60C 2011/0374; B60C 2011/0383; B60C 2011/0365; B60C 2200/065; B60C 2200/06; B60C 2200/08
USPC ........................................ 152/209.18, 209.27
See application file for complete search history.

(56) References Cited

U.S. PATENT DOCUMENTS

2014/0000776 A1* 1/2014 Nakamura .............. B60C 11/11 152/209.25
2015/0298508 A1* 10/2015 Yamakawa ......... B60C 11/1236 152/209.21
2016/0332488 A1* 11/2016 Araki .................. B60C 11/0311
2017/0210179 A1* 7/2017 Motomitsu ............... B60C 9/18

* cited by examiner

L4＝2×L1+2×L3

HEAVY DUTY PNEUMATIC TIRE

TECHNICAL FIELD

The present technology relates to a heavy duty pneumatic tire with a tread pattern.

BACKGROUND ART

There is currently a demand for heavy duty pneumatic tires to be improved in various performance areas. Such improvement may be realized through the design of tread patterns. Heavy duty tires are preferably improved in terms of heat build-up resistance for suppressing heat build-up while running and wear resistance for running on bad roads.

Technology for a heavy duty pneumatic tire is known that improves mud drainage in the contact patch without reducing the block rigidity and thus the wear resistance (see International Patent Application Publication No. WO 2014/002507). This heavy duty pneumatic tire includes, in a tread contact surface, two or more circumferential grooves extending continuously in the tread circumferential direction, lateral grooves opening to the circumferential grooves adjacent to each other in the tread width direction, and a block defined thereby. Each block includes one or more shallow grooves with an average groove depth less than the groove depth of the circumferential grooves adjacent to the block. The average groove depth of the shallow groove is greater than 20% of the groove depth of the circumferential grooves and less than 80% of the groove depth of the circumferential grooves. Additionally, at least one of the shallow grooves opens to at least one of the circumferential grooves adjacent to the block or the lateral groove.

In heavy duty pneumatic tires, mud drainage in the contact patch can be improved without reducing wear resistance. However, heat build-up resistance of heat build-up while running and wear resistance for running on bad roads has not been achieved.

SUMMARY

The present technology provides a heavy duty pneumatic tire with improved heat build-up resistance for suppressing heat build-up during running and wear resistance for running on bad roads.

A heavy duty pneumatic tire according to an aspect of the present technology comprises:

a tread pattern comprising a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, the inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction.

The plurality of center lug grooves and the pair of circumferential main grooves have a narrower groove width than the plurality of shoulder lug grooves; and each region of the plurality of center blocks comprises two first narrow grooves having a curved line shape with no bent portions and having a narrower groove width than the plurality of shoulder lug grooves, each of the first narrow grooves opening to one of the pair of circumferential main grooves and opening to one of the adjacent center lug grooves.

The two first narrow grooves preferably open to different circumferential main grooves.

Portions of the circumferential main grooves where the two first narrow grooves open to the circumferential main grooves are preferably inclined with respect to the tire circumferential direction to the same side as with respect to the tire width direction.

The two first narrow grooves preferably open to different center lug grooves of the adjacent center lug grooves.

The portions of the circumferential main grooves where the first narrow grooves open to are preferably located between a first groove turning portion A, which is one of the first groove turning portions, and a second groove turning portion B, which is one of the second groove turning portions; and the first groove turning portion A is preferably a groove turning portion located adjacent in one direction in the tire circumferential direction to one of the second groove turning portions where the adjacent center lug grooves, which the first narrow grooves open to, open to one of the circumferential main grooves.

In this embodiment, the second groove turning portion B is preferably a groove turning portion located adjacent in the same direction to the first groove turning portion A.

The circumferential main grooves preferably have a shallower maximum groove depth than the plurality of center lug grooves; and the plurality of center lug grooves preferably have a shallower maximum groove depth than the plurality of shoulder lug grooves.

D1/D2 is preferably 0.2 or less, where D1 is a maximum groove depth of the first narrow grooves and D2 is the maximum groove depth of the circumferential main grooves.

L1/L2 preferably ranges from 0.5 to 1.0, where L1 is a groove length along each of the first narrow grooves and L2 is a length of each of the plurality of the center blocks in the tire circumferential direction.

The circumferential main grooves each preferably comprise a raised bottom portion which is a portion where the groove becomes shallower partially.

In this embodiment, D3/T is preferably 0.05 or less, where D3 is a shallowest groove depth in the raised bottom portion and T is a tread width of the tread portion in the tire width direction.

One of the first narrow grooves provided in one of the regions of adjacent center blocks of the plurality of center blocks adjacent in the tire circumferential direction and one of the first narrow grooves provided in the other region preferably open to one of the plurality of center lug grooves at the same position so as to continuously extend on either side of the one of the plurality of center lug grooves.

Shoulder block regions on both sides in the tire width direction provided between adjacent shoulder lug grooves of the plurality of shoulder lug grooves adjacent in the tire circumferential direction preferably comprise second narrow grooves having a narrower groove width than the plurality of shoulder lug grooves, the second narrow grooves terminating within the shoulder block regions and opening to one of the circumferential main grooves.

In this embodiment, the second narrow grooves preferably open to one of the circumferential main grooves at the same position as the first narrow grooves so as to continuously extend on either side of the circumferential main groove.

Additionally, in this embodiment, L3/Ws preferably ranges from 0.3 to 0.8, where L3 is a groove length of the second narrow grooves and Ws is a length of each of the plurality of shoulder blocks in the tire width direction.

One of the first narrow grooves provided in each of the regions of adjacent center blocks of the plurality of center blocks adjacent in the tire circumferential direction opens to one of the plurality of center lug grooves at the same position so as to continuously extend on either side of the one of the plurality of center lug grooves;

shoulder block regions on both sides in the tire width direction provided between adjacent shoulder lug grooves of the plurality of shoulder lug grooves adjacent in the tire circumferential direction comprise second narrow grooves having a narrower groove width than the plurality of shoulder lug grooves, the second narrow grooves terminating within the shoulder blocks and opening to one of the circumferential main grooves; and the first narrow grooves provided in the adjacent center block regions and the second narrow grooves make a set that forms one continuous narrow groove extending through the shoulder block regions on the both sides.

In this embodiment, L4/T preferably ranges from 0.5 to 1.1, where L4 is an entire groove length of the continuous narrow groove and T is the tread width of the tread portion in the tire width direction.

The circumferential main grooves and the plurality of center lug grooves preferably have a groove width ranging from 7 mm to 20 mm.

The heavy duty pneumatic tire is preferably mountable on a construction vehicle or an industrial vehicle.

A heavy duty pneumatic tire according to the aspect described above can provide improved heat build-up resistance for suppressing heat build-up while running and improved wear resistance for running on bad roads.

DETAILED DESCRIPTION

A heavy duty pneumatic tire according to embodiments of the present technology will be described below in detail.

Figure 1:
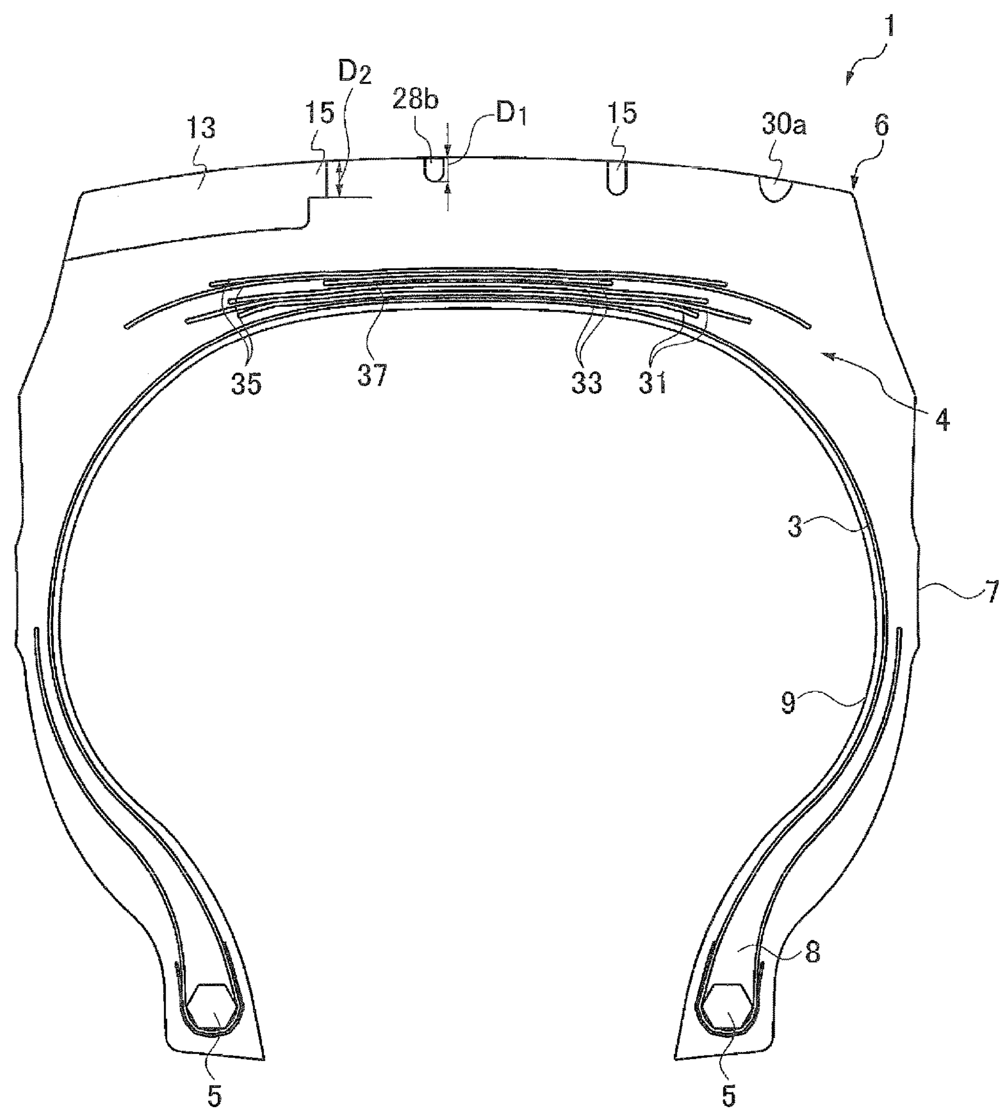
FIG. 1 is an example of a profile cross-sectional view of a heavy duty pneumatic tire according to the present embodiment.

FIG. 1 illustrates an example of a profile cross section of a heavy duty pneumatic tire (also referred to below as "tire") 1 according to the present embodiment including the tire rotation axis of the tire 1 sectioned along a plan including the tire radial direction.

Heavy duty pneumatic tires in this specification include tires described in Section C of JATMA YEAR BOOK 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tire rollers), and tires for mobile cranes (truck cranes, wheel cranes) described in Section D, or vehicular tires described in SECTION 4 or SECTION 6 of TRA (The Tire and Rim Association, Inc.) 2013 YEAR BOOK.

The directions and sides in the present specification are defined as follows.

"Tire width direction" is the direction parallel to the rotation axis of the tire. "Outward in the tire width direction" is the direction in the tire width direction away from a tire equator line CL that represents the tire equatorial plane with respect to the position of comparison. "Inward in the tire width direction" is the direction in the tire width direction toward the tire equator line CL with respect to the position of comparison. "Tire circumferential direction" is the direction the tire rotates with the rotation axis of the tire as the center of rotation. "Tire circumferential direction" includes two distinct directions: a first direction and a second direction. "Tire radial direction" is the direction orthogonal to the rotation axis of the tire. "Outward in the tire radial direction" is the direction away from the rotation axis along the tire radial direction with respect to the position of comparison. "Inward in the tire radial direction" is the direction toward the rotation axis along the tire radial direction with respect to the position of comparison.

Tire Structure

The tire 1 includes a carcass ply 3, a belt portion 4, and a pair of bead cores 5 as structural members, and a tread portion 6, side portions 7, bead fillers 8, and an innerliner 9 as rubber layers around the structural members.

The belt portion 4 includes a pair of first cross belt layers 31, a pair of second cross belt layers 33, a pair of third cross belt layers 35, and a rubber sheet 37 disposed in between the second cross belt layers 33. The first cross belt layers 31, the second cross belt layers 33, and the third cross belt layers 35 are each pairs of belt layers with belt cords of opposing inclination with respect to the tire circumferential direction, and are disposed from inward to outward in the tire radial direction in the stated order.

The tread portion 6 includes a tread pattern 10 as described below.

Such a configuration is but one possible example of the tire 1 and other known configuration may be employed.

Tread Pattern

Figure 2:
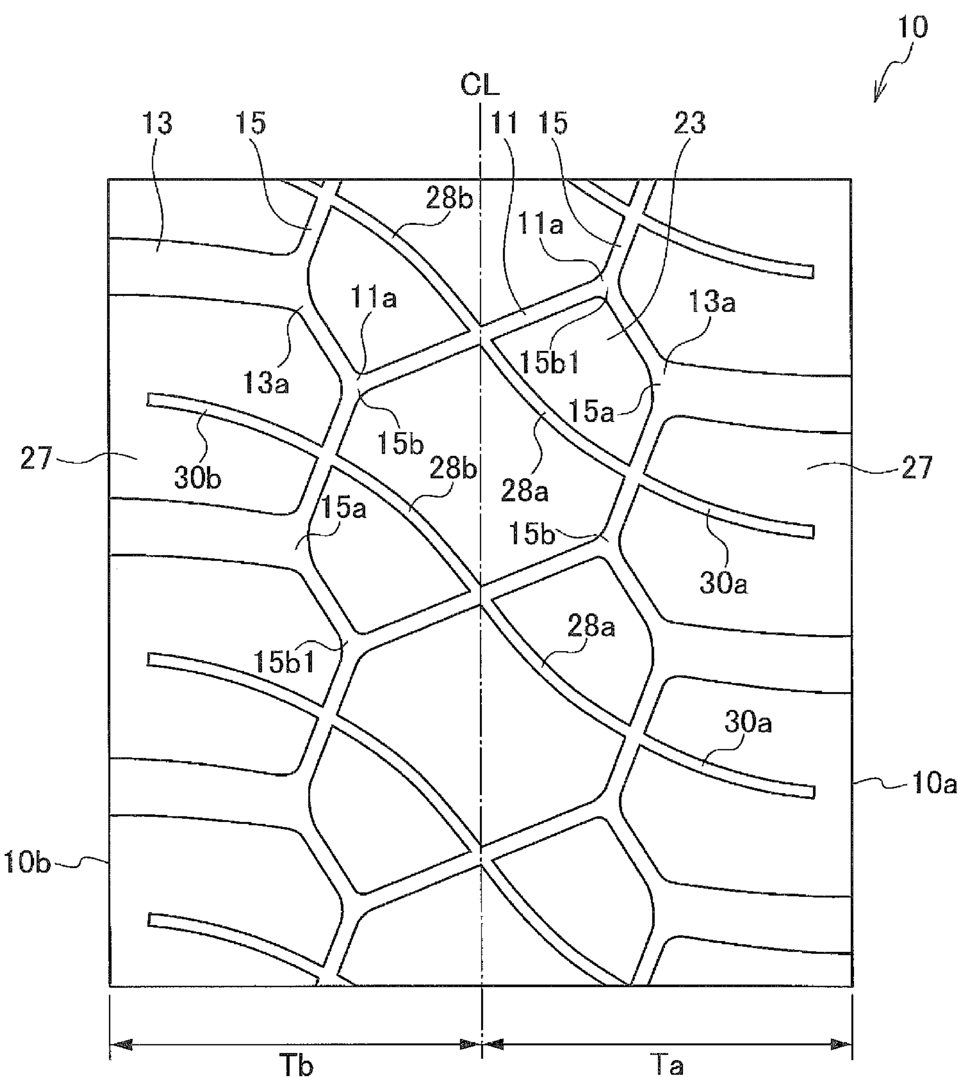
FIG. 2 is a developed plan view of a tread pattern of the heavy duty pneumatic tire according to the present embodiment.

As illustrated in FIG. 2, the tread portion 6 includes the tread pattern 10. FIG. 2 is a developed plan view of the tread pattern 10 of the tire 1. Note that in FIG. 2, the up/down direction is the tire circumferential direction, and the left/right direction is the tire width direction. The tread pattern 10 does not have a designated rotation direction of the tire or an orientation in the tire width direction when mounted on a vehicle.

The tread pattern 10 includes a center lug groove 11, a shoulder lug groove 13, a pair of circumferential main grooves 15, a center block 23, and a shoulder block 27.

A plurality of the center lug grooves 11 are disposed at intervals in the tire circumferential direction. The center lug groove 11 extends at an incline with respect to the tire width direction and the tire circumferential direction in half-tread regions Ta, Tb on either side (first side and second side) in the tire width direction with respect to the tire equator line CL so as to cross the tire equator line CL, and includes ends 11*a*, 11*a* in both sides. The center lug groove 11 connects second groove turning portions 15*b* (described below) of the pair of circumferential main grooves 15. As described below, the pair of circumferential main grooves 15 extend with a wave-like shape having the same period length but are out of phase in the tire circumferential direction. Thus, the center lug groove 11 extends at an incline with respect to the tire width direction. The center lug groove 11 is groove with a linear shape. The center lug groove 11 has a narrower groove width than the shoulder lug groove 13.

A plurality of the shoulder lug grooves 13 are disposed at intervals in the tire circumferential direction in both of the half-tread regions Ta, Tb. The shoulder lug grooves 13 in the half-tread regions Ta, Tb extend outward in the tire width direction and open to the closest ground contact edge of the ground contact edges 10*a*, 10*b* on either side in the tire width direction.

The ground contact edges 10*a*, 10*b* are defined as follows. The ground contact edges 10*a*, 10*b* are end portions of the contact patch in the tire width direction when the tire is brought into contact with a horizontal surface under conditions of the tire 1 being fitted to a regular rim, inflated to the regular internal pressure, and loaded with 100% of the regular load. "Regular rim" refers to a "measuring rim" as defined by JATMA, a "Design Rim" as defined by TRA, and a "Measuring Rim" as defined by ETRTO (European Tyre and Rim Technical Organisation). Additionally, "regular internal pressure" refers to a "maximum air pressure" as defined by JATMA, to the maximum value in "TIRE LOAD LIMITS AT VARIOUS COLD INFLATION PRESSURES" as defined by TRA, and to "INFLATION PRESSURES" as defined by ETRTO. Additionally, "regular load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. Note that the positions of the ground contact edges 10*a*, 10*b* in the tire width direction match the positions of the ends of the tread width in the tire width direction described below.

Among the shoulder lug grooves 13 disposed on both sides in the tire width direction, one shoulder lug groove 13 in one of the half-tread regions is positioned, in the tire circumferential direction, between two adjacent shoulder lug grooves 13 in the other of the half-tread regions.

The shoulder lug grooves 13 in the half-tread regions Ta, Tb each include an inner end 13*a* in the tire width direction located outward in the tire width direction of the position of the ends 11*a* of the center lug grooves 11 in the tire width direction. Additionally, in the tire circumferential direction, one shoulder lug groove 13 is disposed in each of the shoulder regions between adjacent center lug grooves 11 in the tire circumferential direction of the center lug grooves 11. This configuration allows the circumferential main groove 15 described below to form wave-like shapes, in each of the half-tread regions Ta, Tb, by alternately connecting the ends 11*a* of the center lug grooves 11 and the ends 13*a* of the shoulder lug grooves 13 on the inside in the tire width direction. In FIG. 2, the shoulder lug grooves 13 change in groove width in the extension direction of the groove, however, the groove width may be constant.

One of the circumferential main grooves 15 is disposed in each half-tread region Ta, Tb on either side of the tire equator line CL in the tire width direction, making a pair. The circumferential main grooves 15 are formed in wave-like shapes in the respective half-tread regions Ta, Tb over the entire circumference in the tire circumferential direction, with first groove turning portions 15*a* that curve or bend outward in the tire width direction and the second groove turning portions 15*b* that curve or bend inward in the tire width direction disposed so that the circumferential main grooves 15 alternately connect to ends 11*a* of the center lug grooves 11 and the ends 13*a* of the shoulder lug grooves 13 on the inside in the tire width direction. In this configuration, the circumferential main grooves 15 connect to the shoulder lug grooves 13 at the first groove turning portions 15*a* that curve protruding outward in the tire width direction and connect to the center lug grooves 11 at the second groove turning portions 15*b* that curve protruding inward in the tire width direction. A groove having a "wave-like shape" means that the groove has a meandering shape. The circumferential main grooves 15 includes a plurality of the first groove turning portions 15*a* and the second groove turning portions 15*b* around the tire circumference. The circumferential main grooves 15 extend in the tire circumferential direction in a meandering manner rendering the circumferential main grooves 15 in a wave-like shape that connect the groove turning portions alternately.

The first groove turning portions 15*a* and the second groove turning portions 15*b* (also collectively referred to below as "groove turning portions") may have a bent shape, a rounded curved shape, or a combination of a bent shape and a curved shape. A curved shape includes a bent shape which has its corners rounded by a radius of curvature, for example. "A combination of a bent shape and a curved shape" refers to a shape which on one side of a corner of the groove turning portion, the groove extends in a linear manner and on the other side extends in a curved manner. The groove turning portions may have the same bent shape, curved shape, or combination thereof, or may have different shapes from each other. Additionally, the portions of the circumferential main grooves 15 other than the groove turning portions may have a linear shape or a curved shape. If the groove turning portions and the portions other than the groove turning portions both have a curved shape, the two curved shapes may have the same radius of curvature.

As illustrated in FIG. 2, the circumferential main grooves 15 extend with a wave-like shape with an identical period length but out of phase in the tire circumferential direction.

Specifically, the positions of the second groove turning portions 15*b* in the tire circumferential direction are offset in the tire circumferential direction from the second groove turning portions 15*b* in the half-tread region on the opposite side. Note that the circumferential main grooves 15 may extend with a wave-like shape having the same period length and be in phase in the tire circumferential direction, or may extend with wave-like shapes of different period lengths.

The circumferential main grooves 15 have a narrower groove width than the shoulder lug grooves 13. This allows the ground contact pressure on the center blocks 23 when running to be mitigated, and thus extend the wear life of the tire 1.

A plurality of center blocks 23 are defined by the center lug grooves 11, 11 adjacent in the tire circumferential direction and the circumferential main grooves 15, forming a row in the tire circumferential direction. The tire equator line CL passes through the center blocks 23. The center lug grooves 11 being inclined with respect to the tire width direction renders the center blocks 23 in an anisotropic shape inclined with respect to the tire width direction.

The shoulder blocks 27 in each of the half-tread regions Ta, Tb are defined in the tire circumferential direction by pairs of adjacent shoulder lug grooves 13 adjacent in the tire circumferential direction among the shoulder lug grooves 13, the circumferential main grooves 15, and ends (ground contact edges) 10*a*, 10*b* of the tread portion 6 in the tire width direction, forming rows in the tire circumferential direction. In the example illustrated in FIG. 2, the shoulder blocks 27 are inclined toward the side opposite the side the center blocks 23 are inclined with respect to the tire equator line CL.

The tread pattern 10 of the present embodiment has the basic configuration described above. Additionally, the tread pattern 10 includes in each center block 23 region, two first narrow grooves 28*a*, 28*b* that have a curved shape with no bent portions. The first narrow grooves 28*a*, 28*b* open to any one of the circumferential main grooves 15 and to one of the center lug grooves 11, 11 adjacent in the tire circumferential direction, and have a narrower groove width than the shoulder lug grooves 13. "A curved shape with no bent portions" means a curved line with a radius of curvature of 100 mm or greater, measured using of the shape of the curved line following the groove at the groove width center positions, or a combination of a plurality of such curved lines. The curved line of the first narrow grooves 28*a*, 28*b* is preferably shaped protruding toward only the left or the right side with respect to the extension direction of the groove. In the example illustrated in FIG. 2, the curved line shape of the first narrow groove 28*a* protrudes toward the left side of the first narrow groove 28*a* as it extends in the extension direction of the groove from the right side of the paper of FIG. 2 to the left. The curved line shape of the first narrow groove 28*b* protrudes toward the right side of the first narrow groove 28*b* as it extends in the extension direction of the groove from the right side of the paper of FIG. 2 to the left. As illustrated in FIG. 2, the first narrow grooves 28*a*, 28*b* are preferably separated from one another, in other words, do not intersect or meet one another. However, in other embodiments, the first narrow grooves 28*a*, 28*b* may intersect or meet.

Each center block 23 region is provided with the two first narrow grooves 28*a*, 28*b* that have a curved line shape with no bent portions. This allows heat produced in the wide region of the center blocks 23 to be discharged outside via air flowing through the first narrow grooves 28*a*, 28*b*. As a result, heat build-up resistance can be improved. Additionally, the first narrow grooves 28*a*, 28*b* open to any one of the circumferential main grooves 15 and one of the center lug grooves 11, 11 adjacent in the tire circumferential direction. This allows the heat dissipation via discharging the heat produced in the center blocks 23 outside via air to be further improved. Furthermore, the circumferential main grooves 15 have a wave-like shape. This increases the surface area of the groove wall surface. As a result, heat dissipation via discharging the heat produced in the center blocks 23 outside via air flowing through the circumferential main grooves 15 is improved, thus improving heat build-up resistance.

Also, the first narrow grooves 28*a*, 28*b* are provided in the center block 23 regions. This allows close to uniform block rigidity in the tread portion 6 in the tire width direction to be achieved. As a result, concentrated wear can be suppressed, and thus wear resistance can be improved. Additionally, the first narrow grooves 28*a*, 28*b* have a curved line shape with no bent portions. Accordingly, no bent portions where stress concentrates are present in the center block 23 regions, and concentrated wear can be suppressed. As a result, premature wear can be suppressed and wear resistance can be improved. Furthermore, the center lug grooves 11 have a linear shape. Accordingly, no portions of localized reduced block rigidity are present in the center blocks 23 compared to configurations in which center lug grooves 11 have a curved shape or bent shape. This allows close to uniform block rigidity in the center block 23 regions to be achieved. As a result, concentrated wear can be suppressed, and thus wear resistance can be improved. Also, the center lug grooves 11 have a narrower groove width than the shoulder lug grooves 13. This increases the area of the contact patch between the ground and the center blocks 23. As a result, an increase in ground contact pressure is mitigated and wear resistance is improved.

As illustrated in FIG. 2, the first narrow grooves 28*a*, 28*b* preferably open to different circumferential main grooves 15, 15. This configuration allows the air flowing through the first narrow grooves 28*a*, 28*b* to flow through different circumferential main grooves 15, 15. As a result, heat dissipation can be further improved and heat build-up resistance can be improved.

The portions of the circumferential main grooves 15, 15 where the first narrow grooves 28*a*, 28*b* open to the circumferential main grooves 15, 15 are preferably inclined with respect to the tire circumferential direction to the same side as with respect to the tire width direction. In the example illustrated in FIG. 2, the portions where the first narrow grooves 28*a*, 28*b* open to the circumferential main grooves 15, 15 are inclined to the upper right direction with respect to the upward direction of the paper of FIG. 2.

Furthermore, the two first narrow grooves 28*a*, 28*b* preferably open to different adjacent center lug grooves 11. In the example illustrated in FIG. 2, the first narrow groove 28*a* opens to the center lug groove 11 on the upper side of the paper of FIG. 2 in the center block 23, and the first narrow groove 28*b* opens to the center lug groove 11 on the lower side of the paper of FIG. 2 in the center block 23. This configuration allows the air flowing through the first narrow grooves 28*a*, 28*b* to flow through different center lug grooves 11. As a result, heat dissipation can be further improved and heat build-up resistance can be improved.

The portion where the first narrow grooves 28*a*, 28*b* open to the circumferential main grooves 15, 15 are preferably located between the first groove turning portion 15*a* (first groove turning portion A), which is one of the first groove turning portions, and the second groove turning portion 15*b* (second groove turning portion B), which is one of the second groove turning portions. The first groove turning portion 15*a* is a groove turning portion located adjacent in one direction in the tire circumferential direction (in FIG. 2, downward in the half-tread region Ta and upward in the half-tread region Tb) to a second groove turning portion 15*b*1 (denoted in FIG. 2 by the reference sign 15*b*1 to facilitate explanation) where the adjacent center lug grooves 11, 11, which the first narrow grooves 28*a*, 28*b* open to, open to one of the circumferential main grooves 15. The second groove turning portion 15*b* is a groove turning portion located adjacent in the same direction to the first groove turning portion 15*a*. In other words, the portions where the first narrow grooves 28*a*, 28*b* open to the circumferential main grooves 15, 15 are located between the second groove turning portion 15*b* and the first groove turning portion 15*a*. The second groove turning portion 15*b* being, from among the two second groove turning portions adjoining the center block 23, the other one from the second groove turning portion 15*b*1 where the adjacent center lug grooves 11, which the first narrow grooves 28*a*, 28*b* open to, open to the circumferential main groove 15.

Figure 3A:
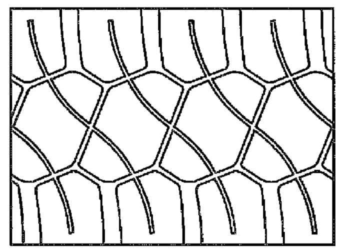
FIGS. 3A to 3E are drawings for explaining how the tread pattern changes as wear progresses for the heavy duty pneumatic tire according to the present embodiment.
Figure 3B:
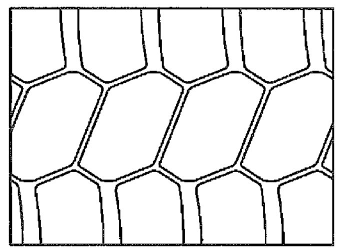
Figure 3C:
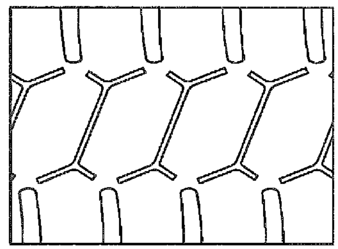
Figure 3D:
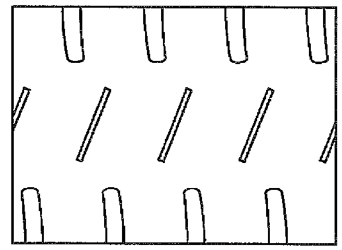
Figure 3E:
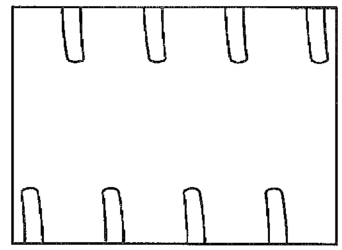

The maximum groove depth of the circumferential main grooves 15 is preferably less than the maximum groove depth of the center lug grooves 11. The maximum groove depth of the center lug grooves 11 is preferably less than the maximum groove depth of the shoulder lug grooves 13. Thus, as wear progresses, the form of the tread pattern changes as illustrated in FIGS. 3A to 3E. FIGS. 3A to 3E are drawings for explaining how the tread pattern changes as wear progresses for the pneumatic tire of the present embodiment. In the early to intermediate stages of wear (the form illustrated in FIGS. 3A and 3B), the center lug grooves 11 communicate with the circumferential main grooves 15. As a result, heat dissipation via air in the center blocks 23 can be maintained. In the terminal stages of wear as illustrated in FIG. 3D, the center lug grooves 11 remain. As a result, traction performance on bad road surfaces can be displayed.

D1/D2 is preferably 0.2 or less, where D1 is the maximum groove depth of the first narrow grooves 28*a*, 28*b* and D2 is the maximum groove depth of the circumferential main grooves 15. When D1/D2 is greater than 0.2, the block rigidity of the center blocks 23 decreases, thus reducing wear resistance. A D1/D2 of 0.05 or greater is preferable because the air flowing through the first narrow grooves 28*a*, 28*b* can induce heat dissipation. Note that in FIG. 1, the groove depths D1 and D2 are illustrated with an exaggerated ratio D1/D2.

Figure 4:
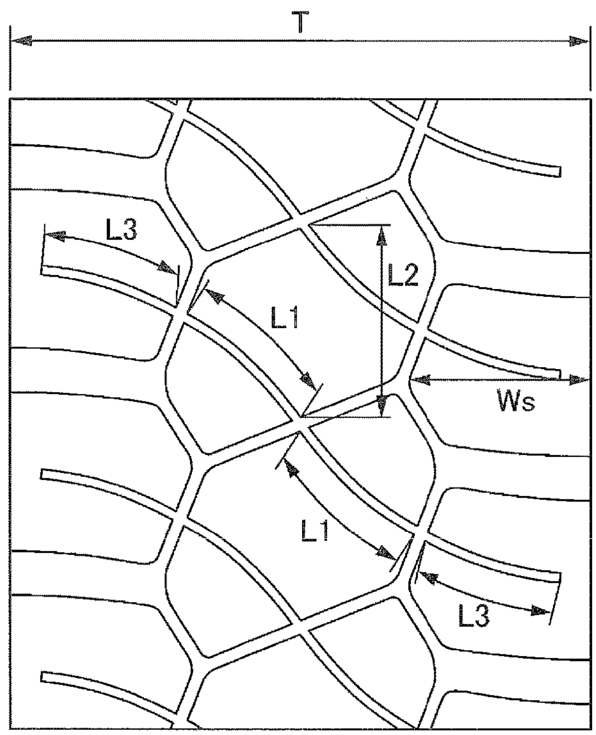
FIG. 4 is a drawing for explaining the dimensions of the tread pattern of the heavy duty pneumatic tire according to the present embodiment.

As illustrated in FIG. 4, L1/L2 preferably ranges from 0.5 to 1.0, where L1 is the groove length along each of the first narrow grooves 28*a*, 28*b* and L2 is the length of the center blocks 23 in the tire circumferential direction. FIG. 4 is a drawing for explaining the dimensions of the elements of the tread pattern 10. When L1/L2 is less than 0.5, the amount of air flowing through the first narrow grooves 28*a*, 28*b* is insufficient for heat dissipation of the center blocks 23, and sufficient heat dissipation is not obtained. As a result, heat build-up resistance is not improved. When L1/L2 is greater than 1.0, the block rigidity of the smaller block elements of the center blocks 23 defined by the two first narrow grooves 28*a*, 28*b* decreases. As a result, the wear resistance is not improved.

Additionally, as illustrated in FIG. 2, the first narrow groove 28*a* provided in one of center block 23, 23 regions adjacent in the tire circumferential direction and the first narrow groove 28*b* provided in the other region preferably open to the center lug groove 11 at the same position in the extension direction of the center lug groove 11 so as to continuously extend on either side of the center lug groove 11. This configuration allows the air to flow smoothly through the first narrow grooves 28*a*, 28*b*. As a result, heat dissipation of the center blocks 23 can be improved.

Second narrow grooves 30*a*, 30*b* are preferably disposed in the shoulder block 27 regions disposed between the shoulder lug grooves 13, 13 adjacent in the tire circumferential direction in both sides in the tire width direction. The second narrow grooves 30*a*, 30*b* terminate within the shoulder block 27 regions and open to the circumferential main grooves 15. The second narrow grooves 30*a*, 30*b* have a narrower groove width than the shoulder lug grooves 13. The second narrow grooves 30*a*, 30*b* improve the heat dissipation of the shoulder blocks 27.

In this configuration, the second narrow grooves 30*a*, 30*b* preferably open to the circumferential main grooves 15 at the same position in the extension direction of the circumferential main grooves 15 as the first narrow grooves 28*a*, 28*b* so as to continuously extend on either side of the circumferential main grooves 15. This configuration allows the air to flow smoothly through the grooves. As a result, the heat dissipation of the shoulder blocks 27 is improved.

As illustrated in FIG. 4, L3/Ws preferably ranges from 0.3 to 0.8, where L3 is the groove length of the second narrow grooves 30*a*, 30*b* and Ws is the length of the shoulder blocks 27 in the tire width direction (length in the tire width direction from the innermost ends of the shoulder blocks 27 in the tire width direction to the ground contact edges 10*a*, 10*b*). When L3/Ws is less than 0.3, the surface area of the groove wall surface is reduced. As a result, the heat dissipation of the shoulder blocks 27 is easily reduced. When L3/Ws is greater than 0.8, the second narrow grooves 30*a*, 30*b* are long in length, reducing the block rigidity of the shoulder blocks 27. As a result, wear resistance is easily reduced.

The first narrow grooves 28*a*, 28*b* provided in the center block 23 regions adjacent in the tire circumferential direction that open at the same position in the extension direction of the center lug groove 11 so as to continuously extend on either side of the center lug groove 11 and the second narrow grooves 30*a*, 30*b* provided in the shoulder block 27, 27 regions preferably make a set that forms one continuous narrow groove extending through the shoulder block 27 regions on the both sides. L4/T preferably ranges from 0.5 to 1.1, where L4 is the entire groove length of the continuous narrow groove and T is the tread width of the tread portion in the tire width direction. Tread width T refers to the periphery length along the contour of the curved shape of the tread portion 6 between the ground contact edges 10*a*, 10*b* on both sides in the tire width direction. When L4/T is less than 0.5, the surface area of the groove wall surface is reduced. As a result, the heat dissipation of the center blocks 23 and the shoulder blocks 27 is easily reduced. When L4/T is greater than 1.1, the first narrow grooves 28*a*, 28*b* and the second narrow grooves 30*a*, 30*b* are long in length, reducing the block rigidity of the center blocks 23 and the shoulder blocks 27. As a result, wear resistance is easily reduced. The entire length L4 does not include the length of the groove width portion of the center lug groove 11 and the circumferential main grooves 15 that the first narrow grooves 28*a*, 28*b* and the second narrow grooves 30*a*, 30*b* intersect.

Figure 5:
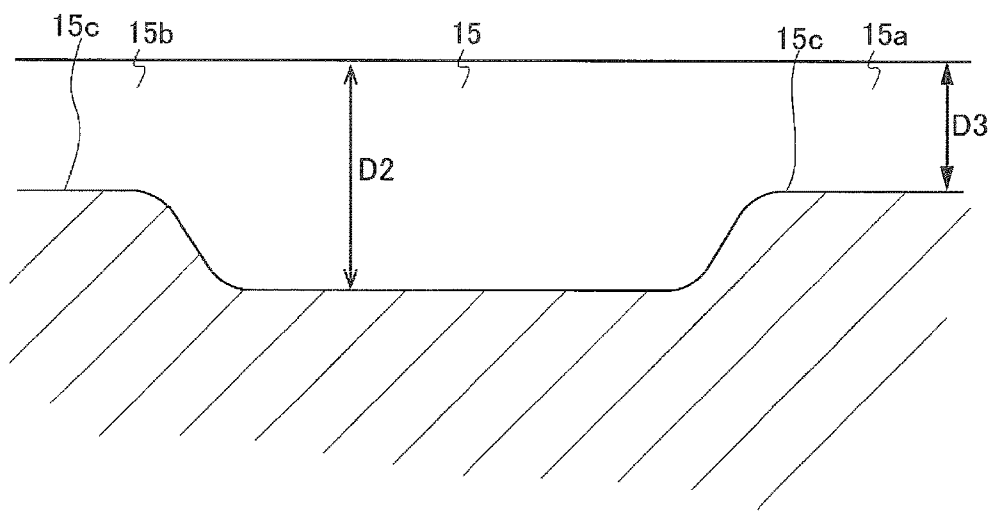
FIG. 5 is a cross-sectional view for explaining a raised bottom portion of a circumferential main groove of the heavy duty pneumatic tire according to the present embodiment.

As illustrated in FIG. 5, the tread pattern 10 is preferably provided with raised bottom portions 15*c*, which are portions in each of the circumferential main grooves 15 where the groove is shallow. FIG. 5 is a cross-sectional view for explaining the raised bottom portions of the circumferential main grooves 15. FIG. 5 illustrates a cross section of the portion between the first groove turning portion 15*a* and the second groove turning portion 15*b* illustrated in FIG. 2, sectioned along a plane including a tire radial direction along the extension direction of the circumferential main groove 15.

The raised bottom portions 15*c* are formed in the first groove turning portion 15*a* and the second groove turning portion 15*b*. In this configuration, the circumferential main groove 15 have a raised bottom where it connects to the center lug grooves 11 and the shoulder lug grooves 13. This allows the block rigidity of the regions near the first groove turning portions 15*a* and the second groove turning portions 15*b* of the center blocks 23 to be improved. As a result, wear resistance is improved. The region between the first groove turning portion 15*a* and the second groove turning portion 15*b* is deep in groove depth. As a result, the effect of cooling the blocks is increased, heat dissipation is improved, and heat build-up resistance is improved.

As illustrated in FIG. 5, the raised bottom portions 15*c* may have a constant groove depth D3 or a varying groove depth. The groove depth D3 is shallowest groove depth of the raised bottom portion 15*c* and the minimum groove depth of the circumferential main groove 15. Examples of a raised bottom portion with a varying groove depth includes a configuration in which the groove depth has a step in the groove depth direction giving the raised bottom portion two or more different groove depths, and a configuration in which the groove depth continuously changes in the extension direction of the groove. The total length of the raised bottom portion 15*c* in the extension direction of the circumferential main groove 15 is not particularly limited. However, the raised bottom portion 15*c* may be formed in a region totaling 30 to 70% of the length of the portion of the circumferential main groove 15 extending between the end of the first groove turning portion 15*a* located outermost in the tire width direction and the end of the second groove turning portion 15*b* located innermost in the tire width direction, including both ends of this portion, and the groove length of this portion.

In the example illustrated in FIG. 5, the raised bottom portions 15*c* are formed in the first groove turning portion 15*a* and the second groove turning portion 15*b*. However, they may be formed in linear shaped portions constituting the wave-like shape of the circumferential main grooves 15. To improve wear resistance, the raised bottom portions 15*c* are preferably formed in the first groove turning portion 15*a* and the second groove turning portion 15*b*.

The tire 1 of the present embodiment preferably has a ratio D3/T ranging from 0.01 to 0.05, where D3 is the shallowest groove depth in the raised bottom portion 15*c* and T is the tread width of the tread portion 6 in the tire width direction. By the ratio D3/T being 0.05 or less, the center blocks 23 and the shoulder blocks 27 support each other, and an appropriate block rigidity is obtained. As a result, premature wear caused by uneven wear can be suppressed. Additionally, by the ratio D3/T being 0.01 or greater, the groove volume required to obtain good heat build-up resistance can be ensured. The ratio D3/T is more preferably 0.048 or less.

In the tread pattern 10, the circumferential main grooves 15 and the center lug grooves 11 preferably have a groove width ranging from 7 mm to 20 mm. This allows heat build-up resistance and wear resistance to be improved. The circumferential main grooves 15 and the center lug grooves 11 have a groove width of 18 mm, for example. Note that by the groove width of the circumferential main grooves 15 and the center lug grooves 11 being in the range described above, the tire 1 is suitable for use as an off-road tire.

The tire 1 according to the present embodiment is suitable to be mounted on a construction vehicle or an industrial vehicle. Examples of construction vehicles and industrial vehicles include a dump truck, scraper, grader, shovel loader, tire roller, wheel crane, and truck crane as specified by JATMA, as well as a compactor, earth mover, grader, loader, and dozer as specified by TRA.

EXAMPLES AND COMPARATIVE EXAMPLES

To examine the effects of a tire according to the present embodiment, test tires with varying tread patterns were manufactured, and the wear resistance and the heat build-up resistance of each were tested. The size of the test tires was 33.00R51. The test tires were mounted on a rim with a rim size of 51×24−5.0 (TRA specified rim) and inflated to an air pressure of 700 kPa (TRA specified air pressure).

Wear resistance was evaluated using a 150 ton dump truck. The dump truck was driven for 3000 hours at a speed of 50 km/h on the same bad road (off-road), then the amount of wear around the center blocks 23 was measured. In the evaluation of wear resistance, the reciprocal of the amount of wear is expressed as an index value with the Comparative Example defined as the reference (index value of 100). Larger index values for wear resistance indicate superior wear resistance.

Heat build-up resistance was evaluated using an indoor drum. The tires were loaded with 110% of the TRA specified load (38750 kgf), and starting at a speed of 5 km/h, the speed was increased by 1 km/h every 12 hours. The running time up until when the tire failed due to heat was measured. Accordingly, heat build-up resistance includes the effects of heat dissipation via air flowing through the grooves. In the evaluation of heat build-up resistance, the measured running time is expressed as an index value with the Comparative Example defined as the reference (index value of 100). Larger index values for heat build-up resistance indicate superior heat build-up resistance.

The test tires for Comparative Example and Examples 1 to 27 were manufactured.

Examples 1 to 27 include the tread pattern 10 illustrated in FIG. 2 as a base, with parameters varied as indicated in the tables. Comparative Example includes the tread pattern 10 illustrated in FIG. 2, except that the tread pattern 10 does not include the first narrow grooves 28*a,* 28*b* and the second narrow grooves 30*a,* 30*b*. Additionally, Comparative Example and Examples 1 to 9 do not include raised bottom portions in the circumferential main grooves and the groove depth thereof is constant. The dimensions of the groove width, groove depth, and groove length of Examples 1 to 27 and Comparative Example are identical values unless limited by the various parameters.

Tables 1 to 6 indicate the various parameters and evaluation results of Comparative Example and Examples 1 to 27.

"Are first narrow grooves continuous?" in the tables means whether or not the first narrow groove 28*a* provided in one center block 23 region of center block 23 regions adjacent in the tire circumferential direction and the first narrow groove 28*b* provided in the other region open at the same position in the extension direction of the center lug groove 11 between the adjacent center blocks 23, 23 so as to form one continuous narrow groove. "Are first narrow grooves and second narrow grooves continuous?" in the tables means whether or not the first narrow grooves 28*a,* 28*b* and the second narrow grooves 30*a,* 30*b* open at the same position in the extension direction of the circumferential main groove 15 so as to form one continuous narrow groove. When "continuous" is not the case, the opening positions are offset by a distance twice the length of the groove widths of the first narrow grooves 28*a,* 28*b* and the second narrow grooves 30*a,* 30*b*.

TABLE 1

| | Comparative Example | Example 1 | Example 2 | Example 3 | Example 4 |
|---|---|---|---|---|---|
| Circumferential main groove with wave-like shape | Yes | Yes | Yes | Yes | Yes |
| Center lug groove with linear shape | Yes | Yes | Yes | Yes | Yes |
| First narrow grooves (two) | No | Yes | Yes | Yes | Yes |
| D1/D2 | — | 0.3 | 0.2 | 0.15 | 0.1 |
| L1/L2 | — | 0.4 | 0.4 | 0.4 | 0.4 |
| D3/T | 0.06 | 0.06 | 0.06 | 0.06 | 0.06 |
| Second narrow groove | No | Yes | Yes | Yes | Yes |
| L3/Ws | — | 0.9 | 0.9 | 0.9 | 0.9 |
| Are first narrow grooves continuous? | — | No | No | No | No |
| Are first narrow grooves and second narrow grooves continuous? | — | No | No | No | No |
| L4/T | — | — | — | — | — |
| Wear resistance | 100 | 103 | 106 | 107 | 108 |
| Heat build-up resistance | 100 | 101 | 102 | 101 | 101 |

TABLE 2

| | Example 5 | Example 6 | Example 7 | Example 8 | Example 9 |
|---|---|---|---|---|---|
| Circumferential main groove with wave-like shape | Yes | Yes | Yes | Yes | Yes |
| Center lug groove with linear shape | Yes | Yes | Yes | Yes | Yes |
| First narrow grooves (two) | Yes | Yes | Yes | Yes | Yes |
| D1/D2 | 0.2 | 0.2 | 0.2 | 0.2 | 0.2 |
| L1/L2 | 0.5 | 0.6 | 0.9 | 1.0 | 1.1 |
| D3/T | 0.06 | 0.06 | 0.06 | 0.06 | 0.06 |
| Second narrow groove | Yes | Yes | Yes | Yes | Yes |
| L3/Ws | 0.9 | 0.9 | 0.9 | 0.9 | 0.9 |
| Are first narrow grooves continuous? | No | No | No | No | No |
| Are first narrow grooves and second narrow grooves continuous? | No | No | No | No | No |
| L4/T | — | — | — | — | — |
| Wear resistance | 106 | 107 | 107 | 106 | 102 |
| Heat build-up resistance | 102 | 103 | 104 | 105 | 105 |

TABLE 3

| | Example 10 | Example 11 | Example 12 | Example 13 |
|---|---|---|---|---|
| Circumferential main groove with wave-like shape | Yes | Yes | Yes | Yes |
| Center lug groove with linear shape | Yes | Yes | Yes | Yes |
| First narrow grooves (two) | Yes | Yes | Yes | Yes |
| D1/D2 | 0.2 | 0.2 | 0.2 | 0.2 |
| L1/L2 | 0.6 | 0.6 | 0.6 | 0.6 |
| D3/T | 0.048 | 0.04 | 0.02 | 0.01 |
| Second narrow groove | Yes | Yes | Yes | Yes |
| L3/Ws | 0.9 | 0.9 | 0.9 | 0.9 |
| Are first narrow grooves continuous? | No | No | No | No |
| Are first narrow grooves and second narrow grooves continuous? | No | No | No | No |
| L4/T | — | — | — | — |
| Wear resistance | 108 | 109 | 109 | 108 |
| Heat build-up resistance | 103 | 103 | 103 | 103 |

TABLE 4

| | Example 14 | Example 15 | Example 16 | Example 17 | Example 18 | Example 19 |
|---|---|---|---|---|---|---|
| Circumferential main groove with wave-like shape | Yes | Yes | Yes | Yes | Yes | Yes |
| Center lug groove with linear shape | Yes | Yes | Yes | Yes | Yes | Yes |

TABLE 4-continued

| | Example 14 | Example 15 | Example 16 | Example 17 | Example 18 | Example 19 |
|---|---|---|---|---|---|---|
| First narrow grooves (two) | Yes | Yes | Yes | Yes | Yes | Yes |
| D1/D2 | 0.2 | 0.2 | 0.2 | 0.2 | 0.2 | 0.2 |
| L1/L2 | 0.6 | 0.6 | 0.6 | 0.6 | 0.6 | 0.6 |
| D3/T | 0.04 | 0.04 | 0.04 | 0.04 | 0.04 | 0.04 |
| Second narrow groove | Yes | Yes | Yes | Yes | Yes | Yes |
| L3/Ws | 0.2 | 0.3 | 0.4 | 0.55 | 0.8 | 0.85 |
| Are first narrow grooves continuous? | No | No | No | No | No | No |
| Are first narrow grooves and second narrow grooves continuous? | No | No | No | No | No | No |
| L4/T | — | — | — | — | — | — |
| Wear resistance | 109 | 112 | 115 | 117 | 115 | 109 |
| Heat build-up resistance | 101 | 102 | 102 | 103 | 104 | 104 |

TABLE 5

| | Example 20 | Example 21 |
|---|---|---|
| Circumferential main groove with wave-like shape | Yes | Yes |
| Center lug groove with linear shape | Yes | Yes |
| First narrow grooves (two) | Yes | Yes |
| D1/D2 | 0.2 | 0.2 |
| L1/L2 | 0.6 | 0.6 |
| D3/T | 0.04 | 0.04 |
| Second narrow groove | No | Yes |
| L3/Ws | — | 0.55 |
| Are first narrow grooves continuous? | Continuous | Continuous |
| Are first narrow grooves and second narrow grooves continuous? | — | No |
| L4/T | — | — |
| Wear resistance | 117 | 117 |
| Heat build-up resistance | 106 | 109 |

TABLE 6

| | Example 22 | Example 23 | Example 24 | Example 25 | Example 26 | Example 27 |
|---|---|---|---|---|---|---|
| Circumferential main groove with wave-like shape | Yes | Yes | Yes | Yes | Yes | Yes |
| Center lug groove with linear shape | Yes | Yes | Yes | Yes | Yes | Yes |
| First narrow grooves (two) | Yes | Yes | Yes | Yes | Yes | Yes |
| D1/D2 | 0.2 | 0.2 | 0.2 | 0.2 | 0.2 | 0.2 |
| L1/L2 | 0.6 | 0.6 | 0.6 | 0.6 | 0.6 | 0.6 |
| D3/T | 0.04 | 0.04 | 0.04 | 0.04 | 0.04 | 0.04 |
| Second narrow groove | Yes | Yes | Yes | Yes | Yes | Yes |
| L3/Ws | 0.55 | 0.55 | 0.55 | 0.55 | 0.55 | 0.55 |
| Are first narrow grooves continuous? | Continuous | Continuous | Continuous | Continuous | Continuous | Continuous |
| Are first narrow grooves and second narrow grooves continuous? | Continuous | Continuous | Continuous | Continuous | Continuous | Continuous |
| L4/T | 0.4 | 0.5 | 0.7 | 0.9 | 1.1 | 1.2 |
| Wear resistance | 117 | 121 | 122 | 122 | 121 | 117 |
| Heat build-up resistance | 110 | 111 | 112 | 113 | 114 | 114 |

From Table 1, it can be seen that by the first narrow grooves 28*a*, 28*b* being provided in the center block 23 regions, wear resistance and heat build-up resistance are improved. Additionally, from Examples 1 to 4 of Table 1, it can be seen that D1/D2 is preferably 0.2 or less, from the perspective of improving heat build-up resistance and particularly wear resistance.

From Table 2, it can be seen that L1/L2 preferably ranges from 0.5 to 1.0, from the perspective of improving wear resistance and heat build-up resistance.

From Table 3, it can be seen that D3/T is preferably 0.05 or less and more preferably 0.048 or less, from the perspective of improving heat build-up resistance and particularly wear resistance.

From Table 4, it can be seen that L3/Ws preferably ranges from 0.3 to 0.8, from the perspective of improving heat build-up resistance and particularly wear resistance.

From Table 5, it can be seen that the second narrow grooves 30*a*, 30*b* are preferably provided in the shoulder block 27 regions and the first narrow grooves 28*a*, 28*b* preferably form a continuous narrow groove, from the perspective of improving heat build-up resistance and particularly wear resistance.

By comparing Example 21 of Table 5 and Example 22 of Table 6, it can be seen that the first narrow grooves 28a, 28b and the second narrow grooves 30a, 30b preferably form a continuous narrow groove, from the perspective of improving heat build-up resistance.

From Table 6, it can be seen that L4/T preferably ranges from 0.5 to 1.1, from the perspective of improving wear resistance and heat build-up resistance.

The foregoing has been a detailed description of the heavy duty pneumatic tire according to embodiments of the present technology. However, the heavy duty pneumatic tire of the present technology is not limited to the above embodiments or examples, and may be enhanced or modified in various ways within the scope of the present technology.

The invention claimed is:

1. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves, and the first narrow grooves not intersecting one another.

2. The heavy duty pneumatic tire according to claim 1, wherein the two first narrow grooves open to different circumferential main grooves.

3. The heavy duty pneumatic tire according to claim 1, wherein portions of the circumferential main grooves where the two first narrow grooves open to the circumferential main grooves are inclined with respect to the tire circumferential direction to the same side as with respect to the tire width direction.

4. The heavy duty pneumatic tire according to claim 1, wherein the two first narrow grooves open to different center lug grooves of the adjacent center lug grooves.

5. The heavy duty pneumatic tire according to claim 1, wherein the circumferential main grooves each comprise a raised bottom portion which is a portion where the groove becomes shallower partially.

6. The heavy duty pneumatic tire according to claim 5, wherein D3/T is 0.05 or less, where D3 is a shallowest groove depth in the raised bottom portion and T is a tread width of the tread portion in the tire width direction.

7. The heavy duty pneumatic tire according to claim 1, wherein the circumferential main grooves and the plurality of center lug grooves have a groove width ranging from 7 mm to 20 mm.

8. The heavy duty pneumatic tire according to claim 1, wherein the heavy duty pneumatic tire is mountable on a construction vehicle or an industrial vehicle.

9. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves; wherein:

the portions of the circumferential main grooves where the first narrow grooves open to are located between a first groove turning portion A, which is one of the first groove turning portions, and a second groove turning portion B, which is one of the second groove turning portions; and the first groove turning portion A is a groove turning portion located adjacent in one direction in the tire circumferential direction to one of the second groove turning portions where the adjacent center lug grooves, which the first narrow grooves open to, open to one of the circumferential main grooves, and the second groove turning portion B is a groove turning portion located adjacent in the same direction to the first groove turning portion A.

10. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves;

wherein the circumferential main grooves have a shallower maximum groove depth than the plurality of center lug grooves; and the plurality of center lug grooves have a shallower maximum groove depth than the plurality of shoulder lug grooves.

11. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves;

wherein D1/D2 is 0.2 or less, where D1 is a maximum groove depth of the first narrow grooves and D2 is the maximum groove depth of the circumferential main grooves.

12. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves;

wherein L1/L2 ranges from 0.5 to 1.0, where L1 is a groove length along each of the first narrow grooves and L2 is a length of each of the plurality of the center blocks in the tire circumferential direction.

13. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves;

wherein one of the first narrow grooves provided in one of the regions of adjacent center blocks of the plurality of center blocks adjacent in the tire circumferential direction and one of the first narrow grooves provided in the other region open to one of the plurality of center lug grooves at the same position so as to continuously extend on either side of the one of the plurality of center lug grooves.

14. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves;

wherein shoulder block regions on both sides in the tire width direction provided between adjacent shoulder lug grooves of the plurality of shoulder lug grooves adjacent in the tire circumferential direction comprise second narrow grooves having a narrower groove width than the plurality of shoulder lug grooves, the second narrow grooves terminating within the shoulder block regions and opening to one of the circumferential main grooves.

15. The heavy duty pneumatic tire according to claim 14, wherein the second narrow grooves open to one of the circumferential main grooves at the same position as the first narrow grooves so as to continuously extend on either side of the circumferential main groove.

16. The heavy duty pneumatic tire according to claim 14, wherein L3/Ws ranges from 0.3 to 0.8, where L3 is a groove length of the second narrow grooves and Ws is a length of each of the plurality of shoulder blocks in the tire width direction.

17. A heavy duty pneumatic tire, comprising a tread pattern comprising:

a plurality of center lug grooves with a linear shape disposed at intervals in a tire circumferential direction that extend at an incline with respect to a tire width direction and the tire circumferential direction in half-tread regions on a first side and a second side in the tire width direction with respect to a tire equator line so as to cross the tire equator line, the center lug grooves having ends in the first side and the second side;

a plurality of shoulder lug grooves disposed at intervals in the tire circumferential direction in both of the half-tread regions that extend outward in the tire width direction, with outer ends in the tire width direction that open to ground contact edges on both sides in the tire width direction, inner ends of the plurality of shoulder lug grooves in the tire width direction being located outward in the tire width direction of the ends of the plurality of center lug grooves, and in the tire circumferential direction, one of the plurality of shoulder lug grooves being disposed between adjacent center lug grooves of the plurality of center lug grooves adjacent in the tire circumferential direction;

a pair of circumferential main grooves formed in both of the half-tread regions with a wave-like shape in the tire circumferential direction, with first groove turning portions that curve or bend outward in the tire width direction and second groove turning portions that curve or bend inward in the tire width direction disposed so that the pair of circumferential main grooves alternately connect to the ends of the plurality of center lug grooves and the inner ends of the plurality of shoulder lug grooves in the tire width direction, the plurality of shoulder lug grooves opening to the pair of circumferential main grooves at the first groove turning portions and the plurality of center lug grooves opening at the second groove turning portions; and a plurality of center blocks defined by the adjacent center lug grooves of the plurality of center lug grooves adjacent in the tire circumferential direction and the pair of circumferential main grooves, forming a row in the tire circumferential direction;

the plurality of center lug grooves and the pair of circumferential main grooves having a narrower groove width than the plurality of shoulder lug grooves; and each region of the plurality of center blocks comprising two first narrow grooves having a curved line shape with no bent portion and having a narrower groove width than the plurality of shoulder lug grooves, each of the first narrow grooves opening to one of the pair of circumferential main grooves and opening to one of the adjacent center lug grooves; wherein:

one of the first narrow grooves provided in each of the regions of adjacent center blocks of the plurality of center blocks adjacent in the tire circumferential direction opens to one of the plurality of center lug grooves at the same position so as to continuously extend on either side of the one of the plurality of center lug grooves;

shoulder block regions on both sides in the tire width direction provided between adjacent shoulder lug grooves of the plurality of shoulder lug grooves adjacent in the tire circumferential direction comprise second narrow grooves having a narrower groove width than the plurality of shoulder lug grooves, the second narrow grooves terminating within the shoulder blocks and opening to one of the circumferential main grooves;

the first narrow grooves provided in the adjacent center block regions and the second narrow grooves make a set that forms one continuous narrow groove extending through the shoulder block regions on the both sides; and L4/T ranges from 0.5 to 1.1, where L4 is an entire groove length of the continuous narrow groove and T is the tread width of the tread portion in the tire width direction.

* * * * *